United States Patent [19]
Tamburelli

[11] 4,211,929
[45] Jul. 8, 1980

[54] FIBER-OPTICAL SYSTEM FOR TRANSMITTING MULTILEVEL SIGNALS

[75] Inventor: Giovanni Tamburelli, Turin, Italy

[73] Assignee: CSELT—Centro Studi e Laboratori Telecomunicazioni S.p.A., Turin, Italy

[21] Appl. No.: 937,816

[22] Filed: Aug. 29, 1978

[30] Foreign Application Priority Data

Sep. 5, 1977 [IT] Italy .............................. 68972 A/77

[51] Int. Cl.$^2$ ............................................. G02B 27/00
[52] U.S. Cl. ..................................... 250/55; 250/205; 455/612; 455/618
[58] Field of Search ......................... 250/199, 227, 551

[56] References Cited
U.S. PATENT DOCUMENTS

| | | | |
|---|---|---|---|
| 3,809,908 | 5/1974 | Clanton | 250/551 |
| 3,851,167 | 11/1974 | Levine | 250/199 |

Primary Examiner—David C. Nelms
Attorney, Agent, or Firm—Karl F. Ross

[57] ABSTRACT

To translate a train of binary electrical pulses into a multilevel luminous signal transmissible at a lower frequency, groups of two or more electrical pulses are temporarily stored in a shift register and then concurrently read out to a set of $2^n-1$ amplifiers feeding as many light emitters where n is the number of pulses per group. The connections between the shift-register stages and the amplifiers are so arranged that the collective intensity of the several light emitters assumes one of $2^n$ possible levels according to the binary value of the pulse group stored in the register. The light sources jointly illuminate an optical fiber, with deviation of some of their rays to electro-optical feedback circuits for controlling the gain of the amplifiers to stabilize their output currents.

8 Claims, 3 Drawing Figures

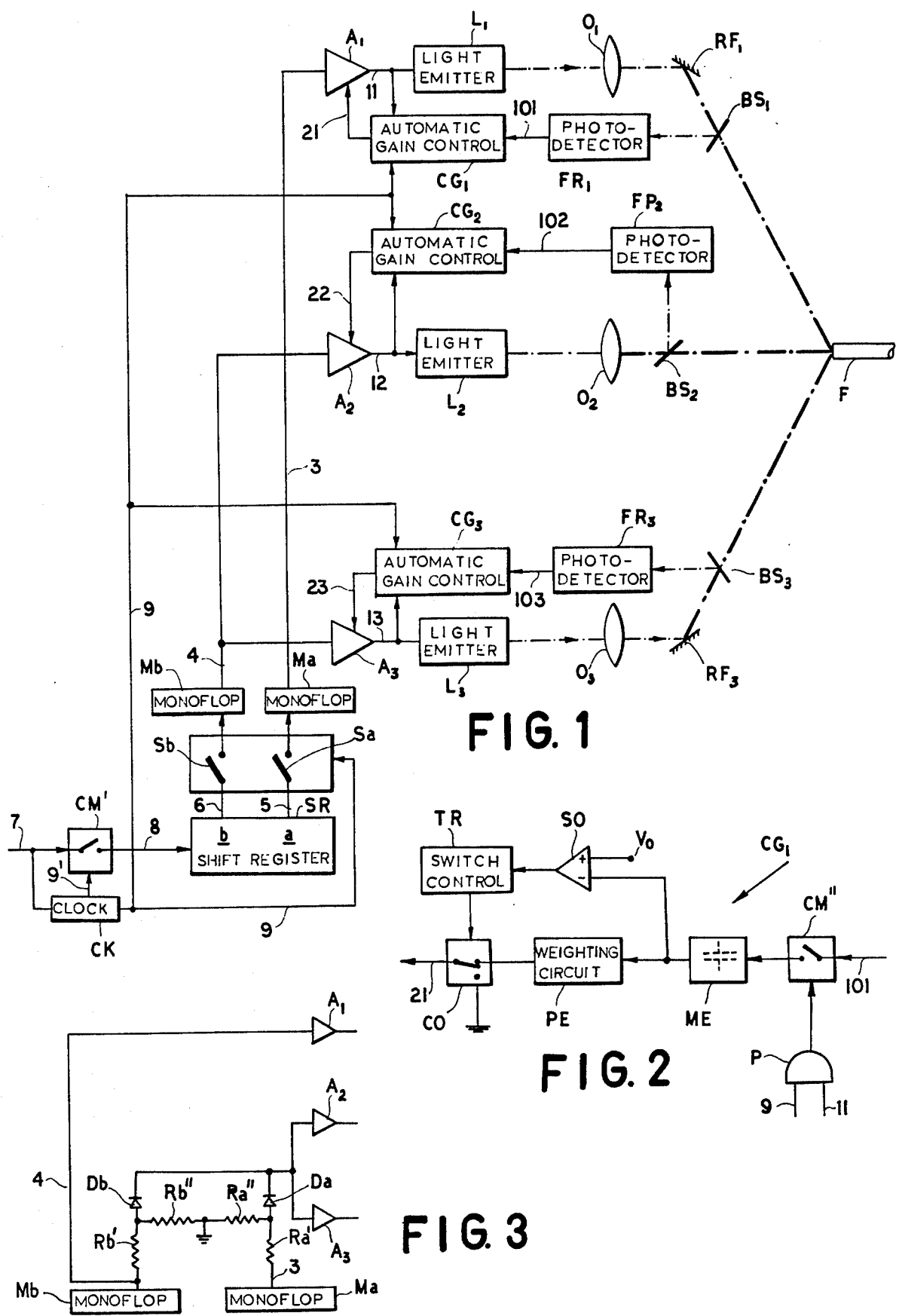

FIBER-OPTICAL SYSTEM FOR TRANSMITTING MULTILEVEL SIGNALS

FIELD OF THE INVENTION

My present invention relates to a fiber-optical system designed to translate binary electrical signals into multilevel luminous signals facilitating the transmission of digital data at an increased rate with a given pulse frequency.

BACKGROUND OF THE INVENTION

While binary electrical signals can be readily translated into binary light signals and vice versa, the absence of a substantially linear relationship between the input and the output of an electro-optical transducer such as a laser or a light-emitting diode militates against the direct conversion of multilevel electrical signals into luminous signals of like character

OBJECTS OF THE INVENTION

The general object of my present invention, therefore, is to provide means in an electro-optical conversion system for changing a high-frequency binary electrical pulse train into a lower-frequency optical pulse train using a multiplicity of distinct signal levels.

A related object is to provide means for stabilizing the several optical signal levels in such a system.

SUMMARY OF THE INVENTION

In accordance with my invention, the binary electrical signals to be translated into multilevel luminous signals are first converted into a train of binary pulses by sampling means working into an n-stage shift register or equivalent memory means serving for the temporary storage of successive groups of n binary pulses, the n pulses so stored being concurrently read out to a set of $2^n - 1$ emitters of incoherent light such as lasers or LEDs whose luminous outputs are additively superposable on a common receiver such as an optical fiber or fiber bundle. The readout occurs by way of circuit means, preferably including an individual amplifier for each light emitter, arranged to energize these light emitters in such a manner that their collective luminous intensity assumes one of $2^n$ possible levels depending upon the binary value of the momentarily stored pulse group.

Thus, the n stage outputs of the aforementioned shift register may be connected via respective switches, closed once very $n^{th}$ pulse cycle, to the energizing circuits of $2^0, 2^1, \ldots 2^n$ light emitters, respectively, to facilitate the establishment of the desired number of light-signal levels which in this instance are equispaced from one another. With n=2, for instance, one register stage—when loaded with a pulse of binary value 1—energizes a single light emitter while the other one works into two light emitters so that all three of these emitters operate when both stages are so loaded, signifying a numerical value of b 3. with n=3 and seven light emitters, the three stage outputs lead to one, two and four light emitters, respectively.

Since this linear scale of signal levels means that the proportional increments decrease toward the upper end of the range, it may be desirable in some cases to modify these output connections in such a way that the collective luminous intensity of the several light emitters varies in steps which are more widely separated with increasing binary value of the stored pulse group. To this end I propose to insert an impedance network between the several stage outputs and a plurality of light emitters (but fewer than all these emitters) for simultaneously energizing same with voltages of different magnitudes when pulses of binary value 1 are present in different register stages, the loading of all these stages with such pulses then causing intensified energization of this plurality of light emitters concurrently with operation of all remaining emitters for maximum light output.

Another feature of my invention resides in the provision of electro-optical feedback means designed to control the gain of each amplifier to stabilize the luminous intensity of the associated light emitter upon energization of that amplifier.

BRIEF DESCRIPTION OF THE DRAWING

The above and other features of my invention will now be described in detail with reference to the accompanying drawing in which:

FIG. 1 is a block diagram of a signal converter forming part of a fiber-optical transmission system according to this invention;

FIG. 2 shows details of an automatic-gain-control network in the circuitry of FIG. 1; and FIG. 3 is a circuit diagram illustrating a modification of the system of FIG. 1.

SPECIFIC DESCRIPTION

In FIG. 1 I have shown an optical fiber F designed to transmit light pulses to a nonillustrated load at a remote destination; fiber F is also representative of a bundle of such fibers carrying the same light pulses in parallel. The entrance end of the fiber is positioned at a junction of three optical paths originating at respective light emitters $L_1, L_2, L_3$, which are driven via leads 11, 12, 13 by associated variable-gain amplifiers $A_1, A_2, A_3$. The incoherent nature of these light emitters enables a summing of their radiant energies in the fiber F. It is to be understood that the light emitted by sources $L_1, L_2, L_3$ need not necessary lie in the visible part of the spectrum.

The light rays emanating from emitters $L_1, L_2, L_3$ are focused upon the entrance end of fiber F by optical means including respective objectives $O_1, O_2, O_3$, shown schematically as lenses, via semitransparent mirrors $BS_1, BS_2$; in the case of emitters $L_1$ and $L_3$ the light path also includes reflectors $RF_1$ $RF_3$. A fraction of the luminous energy is reflected by mirrors $BS_1, BS_2, BS_3$ onto respective photodetectors $FR_1, FR_2, FR_3$ feeding back corrective voltages via leads 101, 102, 103 to automatic-gain-control networks $CG_1, CG_2, CG_3$ whose output leads 21, 22, 23 extend to control electrodes of amplifiers $A_1, A_2, A_3$.

An incoming transmission line 7 carries binary electrical signals whose rhythm is sensed by a clock circuit CK generating a sequence of timing pulses, of corresponding cadence, on a lead 9' for periodically opening a sampling gate CM' and feeding a train of signal pulses on a lead 8 to the input of a two-stage shift register SR. Clock circuit CK has another output lead 9 carrying pulses at half that cadence; lead 9 extends on the one hand to the several automatic-gain-control networks $CG_1, CG_2, CG_3$ and on the other hand to a control input of a pair of switches Sa, Sb in series with the stage outputs 5 and 6 of shift register SR. Upon simultaneous closure of the two switches at the frequency of the timing pulses on lead 9, immediately after every other closure of sampling gate CM', the contents of the two register stages a and b are fed to two pulse shapers in the form of monoflops Ma, Mb having respective output leads 3 and 4. When stage a contains a pulse of binary value 1, monoflop Ma is triggered and stays off-normal for a brief period—substantially corresponding to a timing-pulse cycle on lead 9—to energize the lead 3 which extends to amplifier $A_1$ whereby light emitter $L_1$ is stimulated into generating a beam of predetermined intensity, stabilized by gain-control network $CG_1$ as more fully described hereinafter. When stage b contains such a pulse, monoflop Mb is triggered and stays off-normal for a similar period to energize the lead 4 which extends to amplifiers $A_2$ and $A_3$ whereby light emitters $L_2$ and $L_3$ are stimulated into generating beams of substantially the same intensity.

Thus, if the pulse combination present at a given time in register SR has the binary value 00, 01, 10 or 11, fiber F will receive no illumination (except for residual and possibly ambient radiation) or will receive light from one source (emitter $A_1$), from two sources (emitters $A_2$, $A_3$) or from all three sources, respectively. Some of the emitted radiation, of course, is lost along the three light paths, partly at the semitransparent mirrors $BS_1$–$BS_3$. The light pulses transmitted over fiber F can thus be considered as having levels of numerical values 0, 1, 2 and 3.

In FIG. 2 I have shown a preferred realization of gain-control network $CG_1$ which, of course, is also representative of networks $CG_2$ and $CG_3$. Branches of leads 9 and 11, entering this network, are tied to respective inputs of an AND gate P which controls a circuit closer or feedback gate CM' inserted in lead 101. Gate CM'', accordingly, conducts only during a fraction of each timing-pulse cycle (assuming that clock circuit CK is activated by the presence of incoming signals on lead 7) and in the presence of a voltage pulse in the output of the associated amplifier $A_1$.

The feedback signal on lead 101 is transmitted by gate CM'' to an integrator ME in which its mean value is stored on a capacitor. This mean value is fed, on the one hand, through a weighting circuit PE and a switch CO to the lead 21, extending to the gain-control electrode of the amplifier, and, on the other hand, to a subtractive input of a comparator SO whose additive input receives a threshold voltage $V_o$ as a reference parameter. Whenever the signal present in store ME falls short of reference voltage $V_o$, comparator SO actuates a control circuit TR which reverses the switch CO and grounds the lead 21 for the purpose of restoring the gain in amplifier $A_1$ to its nominal value. This prevents an untimely increase in the gain of the amplifier (with undesirable excitation of light emitter $L_1$) during periods when the pulse flow on its input lead 3 is interrupted. Weighting circuit PE attenuates (or, possibly, amplifies) the stored feedback signal to the extent required for proper gain control.

The linear relationship of the several signal levels transmitted over fiber F results in relatively low ratios at the upper end of the range, such as 4:3 in the four-level case here considered, which may give rise to errors in the presence of significant quantum noise. Pursuant to another feature of my invention, and as illustrated in FIG. 3, the connections between pulse shapers Ma, Mb, and amplifiers $A_1$, $A_2$, $A_3$ may be modified to increase the spacing of the higher levels by the interposition of an impedance network attenuating the driving voltages which are fed to some of the light emitters through their associated amplifiers. In this specific instance, the inputs of amplifiers $A_2$ and $A_3$ are connected in parallel to monoflop Ma by way of voltage divider Ra', Ra'' in series with a diode Da and to monoflop Mb by way of a voltage divider Rb', Rb'' in series with a diode Db. Output lead 4 of monoflop Mb is also directly connected to amplifier $A_1$.

The resistors of voltage dividers Ra', Ra'' and Rb', Rb'' (which, obviously, could be part of the output circuits of the monoflops themselves) are so proportioned that their combined output voltage, present when both monoflops are triggered, substantially equals the unattenuated voltage on lead 4 so that all three amplifiers receive approximately identical signals in the presence of a pulse combination of binary value 11, as in the embodiment of FIG. 1. Furthermore, the attenuation introduced by voltage divider Ra', Ra'' should be less than that introduced by voltage divider Rb', Rb'', being so chosen that energization of lead 3 by monoflop Ma produces a luminous intensity in the output of each associated emitter $L_2$, $L_3$ ranging between one-fourth and one-half of the value it has when both leads 3 and 4 carry voltage. Thus, for example, the combined emission of sources $L_2$ and $L_3$ (based upon a value of two for full energization) may amount to six-fifths in the presence of a pulse group 0-1 in register SR, to four-fifths in the presence of a pulse group 1-0 and to unity in the presence of a pulse group 1-1; with emitters $L_2$ and $L_3$ driven in all three instances and emitter $L_1$ also driven in the two last-mentioned ones, the several signal levels (disregarding losses and residual or ambient illumination) will have magnitudes of 0, 6/5, 4/5+1=9/5, and 3, respectively, corresponding to a ratio of 0:2:3:5.

The optical paths extending between semireflecting mirrors $BS_1$–$BS_3$ and fiber F could be constituted by other light-conducting fibers, if desired; the assembly of these fibers into a single bundle, designed to illuminate a load such as a photodetector, could take place at the remote end of the transmission path.

With the arrangement FIG. 3, the gain-control networks $CG_2$, $CG_3$ may be so designed that their AND gates P (cf. FIG. 2) conduct only when their associated amplifier outputs 12, 13 carry signal voltages corresponding to full energization, i.e. to voltage on both leads 3 and 4.

If resistors Ra' and Rb' in FIG. 3 had magnitudes approaching infinity and zero, respectively, this system would be substantially converted to that of FIG. 1.

I claim:
1. A system for translating binary electrical signals into multilevel luminous signals, comprising:
   sampling means connected to a source of said electrical signals and operable to convert same into a train of binary pulses;
   memory means connected to said sampling means for temporarily storing successive groups of n binary pulses where n is a positive integer greater than zero;
   a set of $2^n - 1$ emitters of incoherent light;
   circuit means connected to said memory means for selectively energizing said emitters with a collective luminous intensity assuming one of $2^n$ possible levels depending upon the binary value of the pulse group stored in said memory means; and
   fiber-optical means positioned to receive light from all said emitters for transmission to a load.

2. A system as defined in claim 1, further comprising light-guiding means between said emitters and said fiber-optical means, a plurality of variable-gain amplifiers in said circuit means respectively connected to said emitters for energizing same, a photodetector for each of said amplifiers positioned for illumination by the associated emitter via said light-guiding means, and feedback means extending from each photodetector to a gain-control input of the respective amplifier for stabilizing the luminous intensity of the associated light emitter upon energization by the respective amplifier.

3. A system as defined in claim 2 wherein said feedback means includes integrating means connected to the respective photodetector for storing a mean output signal thereof, further comprising switch means controlled by said integrating means for deactivating said feedback means upon said mean output signal dropping below a predetermined threshold.

4. A system as defined in claim 3 wherein said feedback means further includes circuit-closing means upstream of said integrating means jointly controlled by said sampling means and the respective amplifier for connecting said integrating means to the respective photodetector only during a sampling cycle in which the respective amplifier has a significant output.

5. A system as defined in claim 1, 2, 3 or 4 wherein said memory means comprises an n-stage shift register with n stage outputs, said circuit means including n switches respectively connected to said stage outputs and timing means synchronized with said sampling means for simultaneously closing said n switches to unload said shift register after every n pulses loaded into same.

6. A system as defined in claim 5 wherein said switches are connected by said circuit means to different combinations of said emitters for concurrently energizing all said emitters upon the loading of all said stages with pulses of binary value 1 and for energizing fewer than all said emitters upon the loading of fewer stages with pulses of binary value 1.

7. A system as defined in claim 6 wherein said circuit means includes an impedance network inserted between said stage outputs and a plurality smaller than $2^n-1$ of said emitters for simultaneously energizing said plurality of emitters with respective voltages of different magnitudes in the presence of a pulse of binary value 1 in different stages, said magnitudes being chosen to vary said collective luminous intensity in steps that are more widely separated with increasing binary value of the stored pulse group.

8. A system as defined in claim 1, 2, 3 or 4 wherein said fiber-optical means comprises at least one fiber with an entrance end illuminated by all said emitters in their energized state.

* * * * *